US012334029B2

(12) United States Patent
Crounse

(10) Patent No.: US 12,334,029 B2
(45) **Date of Patent: *Jun. 17, 2025**

(54) COLOR DISPLAYS CONFIGURED TO CONVERT RGB IMAGE DATA FOR DISPLAY ON ADVANCED COLOR ELECTRONIC PAPER

(71) Applicant: E INK CORPORATION, Billerica, MA (US)

(72) Inventor: Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,049

(22) Filed: Mar. 28, 2024

(65) Prior Publication Data

US 2024/0242685 A1 Jul. 18, 2024

Related U.S. Application Data

(63) Continuation of application No. 18/138,791, filed on Apr. 25, 2023, now Pat. No. 11,984,088.

(60) Provisional application No. 63/335,677, filed on Apr. 27, 2022.

(51) Int. Cl.
*G09G 3/34* (2006.01)
*G02F 1/167* (2019.01)
*G09G 3/20* (2006.01)

(52) U.S. Cl.
CPC ........... *G09G 3/344* (2013.01); *G09G 3/2096* (2013.01); *G09G 2320/0285* (2013.01); *G09G 2320/041* (2013.01); *G09G 2320/0666* (2013.01); *G09G 2340/06* (2013.01)

(58) Field of Classification Search
CPC .. G09G 5/02; G09G 5/06; G09G 3/20; G09G 3/28; G09G 3/34; G09G 3/344; G09G 3/2096; G09G 2320/041; G09G 2320/0285; G09G 2320/0666; G09G 2340/06; G02B 5/22; G02B 26/00; G02B 26/08
See application file for complete search history.

(56) References Cited

U.S. PATENT DOCUMENTS

| | | | |
|---|---|---|---|
| 4,418,346 | A | 11/1983 | Batchelder |
| 5,872,552 | A | 2/1999 | Gordon, II et al. |
| 5,930,026 | A | 7/1999 | Jacobson |
| 6,017,584 | A | 1/2000 | Albert et al. |

(Continued)

OTHER PUBLICATIONS

Kitamura, T. et al., "Electrical toner movement for electronic paper-like display", Asia Display/IDW '01, pp. 1517-1520, Paper HCS1-1 (2001).

(Continued)

*Primary Examiner* — Chanh D Nguyen
*Assistant Examiner* — Nguyen H Truong
(74) *Attorney, Agent, or Firm* — Brian D. Bean

(57) ABSTRACT

A color display, including an electrophoretic medium, wherein the display includes a processor configured to transform image source colors, which are typically standard RGB values, to electrophoretic display device colors, for example ACeP device colors, for displaying the image in the best possible colors on the color display. The processor uses a look up table that depends upon eight primary colors that are produced by the electrophoretic medium.

15 Claims, 12 Drawing Sheets

(56) References Cited

U.S. PATENT DOCUMENTS 6,130,774 A 10/2000 Albert et al.
6,144,361 A 11/2000 Gordon, II
6,184,856 B1 2/2001 Gordon, II
6,225,971 B1 5/2001 Gordon, II
6,241,921 B1 6/2001 Jacobson et al.
6,271,823 B1 8/2001 Gordon, II
6,445,489 B1 9/2002 Jacobson et al.
6,504,524 B1 1/2003 Gates et al.
6,512,354 B2 1/2003 Jacobson et al.
6,531,997 B1 3/2003 Gates et al.
6,545,797 B2 4/2003 Chen et al.
6,664,944 B1 12/2003 Albert et al.
6,672,921 B1 1/2004 Liang et al.
6,753,999 B2 6/2004 Zehner et al.
6,788,449 B2 9/2004 Liang et al.
6,788,452 B2 9/2004 Liang et al.
6,825,970 B2 11/2004 Goenaga et al.
6,866,760 B2 3/2005 Paolini, Jr. et al.
6,900,851 B2 5/2005 Morrison et al.
6,922,276 B2 7/2005 Zhang et al.
6,982,178 B2 1/2006 LeCain et al.
6,995,550 B2 2/2006 Jacobson et al.
7,002,728 B2 2/2006 Pullen et al.
7,012,600 B2 3/2006 Zehner et al.
7,023,420 B2 4/2006 Comiskey et al.
7,034,783 B2 4/2006 Gates et al.
7,038,656 B2 5/2006 Liang et al.
7,038,670 B2 5/2006 Liang et al.
7,046,228 B2 5/2006 Liang et al.
7,052,571 B2 5/2006 Wang et al.
7,061,166 B2 6/2006 Kuniyasu
7,061,662 B2 6/2006 Chung et al.
7,072,095 B2 7/2006 Liang et al.
7,075,502 B1 7/2006 Drzaic et al.
7,116,318 B2 10/2006 Amundson et al.
7,116,466 B2 10/2006 Whitesides et al.
7,119,772 B2 10/2006 Amundson et al.
7,144,942 B2 12/2006 Zang et al.
7,167,155 B1 1/2007 Albert et al.
7,170,670 B2 1/2007 Webber
7,176,880 B2 2/2007 Amundson et al.
7,177,066 B2 2/2007 Chung et al.
7,193,625 B2 3/2007 Danner et al.
7,202,847 B2 4/2007 Gates
7,236,291 B2 6/2007 Kaga et al.
7,259,744 B2 8/2007 Arango et al.
7,312,784 B2 12/2007 Baucom et al.
7,321,459 B2 1/2008 Masuda
7,327,511 B2 2/2008 Whitesides et al.
7,339,715 B2 3/2008 Webber et al.
7,385,751 B2 6/2008 Chen et al.
7,408,699 B2 8/2008 Wang et al.
7,411,719 B2 8/2008 Paolini, Jr. et al.
7,453,445 B2 11/2008 Amundson
7,492,339 B2 2/2009 Amundson
7,492,505 B2 2/2009 Liang et al.
7,528,822 B2 5/2009 Amundson et al.
7,535,624 B2 5/2009 Amundson et al.
7,561,324 B2 7/2009 Duthaler et al.
7,583,251 B2 9/2009 Arango et al.
7,602,374 B2 10/2009 Zehner et al.
7,612,760 B2 11/2009 Kawai
7,667,684 B2 2/2010 Jacobson et al.
7,679,599 B2 3/2010 Kawai
7,679,814 B2 3/2010 Paolini, Jr. et al.
7,683,606 B2 3/2010 Kang et al.
7,715,088 B2 5/2010 Liang et al.
7,787,169 B2 8/2010 Abramson et al.
7,800,813 B2 9/2010 Wu et al.
7,839,564 B2 11/2010 Whitesides et al.
7,859,742 B1 12/2010 Chiu et al.
7,910,175 B2 3/2011 Webber
7,952,557 B2 5/2011 Amundson
7,952,790 B2 5/2011 Honeyman et al.
7,982,479 B2 7/2011 Wang et al.
7,982,941 B2 7/2011 Lin et al.
7,999,787 B2 8/2011 Amundson et al.
8,009,348 B2 8/2011 Zehner et al.
8,040,594 B2 10/2011 Paolini, Jr. et al.
8,054,526 B2 11/2011 Bouchard
8,077,141 B2 12/2011 Duthaler et al.
8,098,418 B2 1/2012 Paolini, Jr. et al.
8,125,501 B2 2/2012 Amundson et al.
8,139,050 B2 3/2012 Jacobson et al.
8,159,636 B2 4/2012 Sun et al.
8,174,490 B2 5/2012 Whitesides et al.
8,237,733 B2 8/2012 Rhodes
8,243,013 B1 8/2012 Sprague et al.
8,274,472 B1 9/2012 Wang et al.
8,289,250 B2 10/2012 Zehner et al.
8,300,006 B2 10/2012 Zhou et al.
8,314,784 B2 11/2012 Ohkami et al.
8,363,299 B2 1/2013 Paolini, Jr. et al.
8,373,649 B2 2/2013 Low et al.
8,384,658 B2 2/2013 Albert et al.
8,422,116 B2 4/2013 Sprague et al.
8,456,414 B2 6/2013 Lin et al.
8,462,102 B2 6/2013 Wong et al.
8,503,063 B2 8/2013 Sprague
8,514,168 B2 8/2013 Chung et al.
8,537,105 B2 9/2013 Chiu et al.
8,558,783 B2 10/2013 Wilcox et al.
8,558,786 B2 10/2013 Lin
8,558,855 B2 10/2013 Sprague et al.
8,576,164 B2 11/2013 Sprague et al.
8,576,259 B2 11/2013 Lin et al.
8,576,470 B2 11/2013 Paolini, Jr. et al.
8,576,475 B2 11/2013 Huang et al.
8,576,476 B2 11/2013 Telfer et al.
8,605,032 B2 12/2013 Liu et al.
8,605,354 B2 12/2013 Zhang et al.
8,649,084 B2 2/2014 Wang et al.
8,665,206 B2 3/2014 Lin et al.
8,670,174 B2 3/2014 Sprague et al.
8,681,191 B2 3/2014 Yang et al.
8,704,756 B2 4/2014 Lin
8,717,664 B2 5/2014 Wang et al.
8,786,935 B2 7/2014 Sprague
8,797,634 B2 8/2014 Paolini, Jr. et al.
8,810,525 B2 8/2014 Sprague
8,830,562 B2 9/2014 Kim et al.
8,873,129 B2 10/2014 Paolini, Jr. et al.
8,902,153 B2 12/2014 Bouchard et al.
8,902,491 B2 12/2014 Wang et al.
8,917,439 B2 12/2014 Wang et al.
8,928,562 B2 1/2015 Gates et al.
8,928,641 B2 1/2015 Chiu et al.
8,963,903 B2 2/2015 Sakamoto et al.
8,964,282 B2 2/2015 Wang et al.
8,976,444 B2 3/2015 Zhang et al.
9,013,394 B2 4/2015 Lin
9,013,783 B2 4/2015 Sprague
9,019,197 B2 4/2015 Lin
9,019,198 B2 4/2015 Lin et al.
9,019,318 B2 4/2015 Sprague et al.
9,082,352 B2 7/2015 Cheng et al.
9,116,412 B2 8/2015 Lin
9,146,439 B2 9/2015 Zhang
9,170,468 B2 10/2015 Lin et al.
9,182,646 B2 11/2015 Paolini, Jr. et al.
9,195,111 B2 11/2015 Anseth et al.
9,199,441 B2 12/2015 Danner
9,218,773 B2 12/2015 Sun et al.
9,224,338 B2 12/2015 Chan et al.
9,224,342 B2 12/2015 Lin et al.
9,224,344 B2 12/2015 Chung et al.
9,230,492 B2 1/2016 Harrington et al.
9,251,736 B2 2/2016 Lin et al.
9,262,973 B2 2/2016 Wu et al.
9,279,906 B2 3/2016 Kang
9,285,649 B2 3/2016 Du et al.
9,299,294 B2 3/2016 Lin et al.
9,360,733 B2 6/2016 Wang et al.
9,361,836 B1 6/2016 Telfer et al.

(56) References Cited

U.S. PATENT DOCUMENTS

| | | | |
|---|---|---|---|
| 9,383,623 B2 | 7/2016 | Lin et al. | |
| 9,390,066 B2 | 7/2016 | Smith | |
| 9,390,661 B2 | 7/2016 | Chiu et al. | |
| 9,423,666 B2 | 8/2016 | Wang et al. | |
| 9,436,056 B2 | 9/2016 | Paolini, Jr. et al. | |
| 9,459,510 B2 | 10/2016 | Lin | |
| 9,460,666 B2 | 10/2016 | Sprague et al. | |
| 9,489,919 B2 | 11/2016 | Wang et al. | |
| 9,495,918 B2 | 11/2016 | Harrington et al. | |
| 9,501,981 B2 | 11/2016 | Lin et al. | |
| 9,513,527 B2 | 12/2016 | Chan et al. | |
| 9,513,743 B2 | 12/2016 | Sjodin et al. | |
| 9,514,667 B2 | 12/2016 | Lin | |
| 9,541,814 B2 | 1/2017 | Lin et al. | |
| 9,564,104 B1 * | 2/2017 | Letourneur | G09G 3/344 |
| 9,612,502 B2 | 4/2017 | Danner et al. | |
| 9,620,048 B2 | 4/2017 | Sim et al. | |
| 9,671,668 B2 | 6/2017 | Chan et al. | |
| 9,672,766 B2 | 6/2017 | Sjodin | |
| 9,691,333 B2 | 6/2017 | Cheng et al. | |
| 9,697,778 B2 | 7/2017 | Telfer et al. | |
| 9,721,495 B2 | 8/2017 | Harrington et al. | |
| 9,759,976 B2 | 9/2017 | Chen | |
| 9,759,980 B2 | 9/2017 | Du et al. | |
| 9,792,861 B2 | 10/2017 | Chang et al. | |
| 9,792,862 B2 | 10/2017 | Hung et al. | |
| 9,812,073 B2 | 11/2017 | Lin et al. | |
| 9,921,451 B2 | 3/2018 | Telfer et al. | |
| 10,037,735 B2 | 7/2018 | Amundson | |
| 10,162,242 B2 | 12/2018 | Wang et al. | |
| 10,209,556 B2 | 2/2019 | Rosenfeld et al. | |
| 10,229,641 B2 | 3/2019 | Yang et al. | |
| 10,276,109 B2 | 4/2019 | Crounse et al. | |
| 10,319,313 B2 | 6/2019 | Harris et al. | |
| 10,332,435 B2 | 6/2019 | Wang et al. | |
| 10,339,876 B2 | 7/2019 | Lin et al. | |
| 10,353,266 B2 | 7/2019 | Bouchard et al. | |
| 10,444,553 B2 | 10/2019 | Laxton | |
| 10,444,592 B2 | 10/2019 | Bouchard | |
| 10,467,984 B2 | 11/2019 | Buckley et al. | |
| 10,593,272 B2 | 3/2020 | Telfer et al. | |
| 10,672,350 B2 | 6/2020 | Amundson et al. | |
| 11,049,463 B2 | 6/2021 | Lin et al. | |
| 2003/0102858 A1 | 6/2003 | Jacobson et al. | |
| 2004/0246562 A1 | 12/2004 | Chung et al. | |
| 2005/0253777 A1 | 11/2005 | Zehner et al. | |
| 2007/0103427 A1 | 5/2007 | Zhou et al. | |
| 2007/0176912 A1 | 8/2007 | Beames et al. | |
| 2008/0024429 A1 | 1/2008 | Zehner | |
| 2008/0024482 A1 | 1/2008 | Gates et al. | |
| 2008/0043318 A1 | 2/2008 | Whitesides et al. | |
| 2008/0136774 A1 | 6/2008 | Harris et al. | |
| 2008/0303780 A1 | 12/2008 | Sprague et al. | |
| 2010/0156780 A1 | 6/2010 | Jacobson et al. | |
| 2010/0194733 A1 | 8/2010 | Lin et al. | |
| 2010/0194789 A1 | 8/2010 | Lin et al. | |
| 2010/0265561 A1 | 10/2010 | Gates et al. | |
| 2011/0043543 A1 | 2/2011 | Chen et al. | |
| 2011/0063314 A1 | 3/2011 | Chiu et al. | |
| 2011/0221740 A1 | 9/2011 | Yang et al. | |
| 2012/0001957 A1 | 1/2012 | Liu et al. | |
| 2012/0098740 A1 | 4/2012 | Chiu et al. | |
| 2012/0229885 A1 * | 9/2012 | Chen | G02F 1/167 430/37 |
| 2012/0256893 A1 * | 10/2012 | Sakamoto | G09G 3/2081 345/208 |
| 2013/0063333 A1 | 3/2013 | Arango et al. | |
| 2013/0114126 A1 * | 5/2013 | Kim | G02F 1/167 430/319 |
| 2013/0249782 A1 | 9/2013 | Wu et al. | |
| 2014/0055840 A1 | 2/2014 | Zang et al. | |
| 2014/0063039 A1 * | 3/2014 | Drzaic | G09G 5/02 345/589 |
| 2014/0078576 A1 | 3/2014 | Sprague | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2014/0362213 A1 | 12/2014 | Tseng | |
| 2015/0005720 A1 | 1/2015 | Zang et al. | |
| 2015/0262255 A1 | 9/2015 | Khajehnouri | |
| 2015/0268531 A1 | 9/2015 | Wang et al. | |
| 2015/0301246 A1 | 10/2015 | Zang et al. | |
| 2016/0012710 A1 | 1/2016 | Lu et al. | |
| 2016/0180777 A1 | 6/2016 | Lin et al. | |
| 2018/0254020 A1 * | 9/2018 | Buckley | G09G 3/344 |
| 2018/0259824 A1 * | 9/2018 | Bouchard | G09G 3/207 |
| 2022/0084473 A1 | 3/2022 | Telfer et al. | |

OTHER PUBLICATIONS

Yamaguchi, Y. et al., “Toner display using insulative particles charged triboelectrically”, Asia Display/IDW ’01, pp. 1729-1730, Paper AMD4-4 (2001).

Pappas, Thrasyvoulos N. “Model-based halftoning of color images.” IEEE Transactions on image processing 6.7 (1997): 1014-1024.

European Patent Office, “International Search Report and Written Opinion”, PCT/US2023/019704, Jun. 30, 2023.

* cited by examiner

Tetrahedral decomposition of RGB color space

Cubical source RGB color space

COLOR DISPLAYS CONFIGURED TO CONVERT RGB IMAGE DATA FOR DISPLAY ON ADVANCED COLOR ELECTRONIC PAPER

RELATED APPLICATIONS

This application is a continuation of U.S. patent application Ser. No. 18/138,791, filed Apr. 25, 2023 and published as U.S. Patent Publication No. 2023/0351977, which claims priority to U.S. Provisional Patent Application No. 63/335,677, filed Apr. 27, 2022. All patents and publications disclosed herein are incorporated by reference in their entireties.

BACKGROUND

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP®) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276, 109, 10,353,266, 10,467,984, and 10,593,272.

This invention relates to color electrophoretic displays, especially, but not exclusively, to electrophoretic displays capable of rendering more than two colors using a single layer of electrophoretic material comprising a plurality of colored particles, for example white, cyan, yellow, and magenta particles. In some instances two of the particles will be positively-charged, and two particles will be negatively-charged. In some instances three of the particles will be positively-charged, and one particle will be negatively-charged. In some instances, one positively-charged particle will have a thick polymer shell and one negatively-charged particle has a thick polymer shell.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462, 102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. Sec, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display.

Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

A commonly used system for quantifying the color characteristics of a display, including both brightness and hue is the CIELAB system, which assigns color coordinate values (i.e., L*, a*, b*) corresponding to colors displayed by typical color reflective display devices under a CIE standard illuminant D65 (e.g., with color temperature 6500K). L* represents lightness from black to white on a scale of zero to 100, while a* and b* represent chromaticity with no specific numeric limits. Negative a* corresponds with green, positive a* corresponds with red, negative b* corresponds with blue and positive b* corresponds with yellow. L* can be converted to reflectance with the following formula: $L^*=116(R/R_0)^{1/3}-16$, where R is the reflectance and $R_0$ is a standard reflectance value.

U.S. Pat. Nos. 8,576,476 and 8,797,634 describe multicolor electrophoretic displays having a single back plane comprising independently addressable pixel electrodes and a common, light-transmissive front electrode. The common, light-transmissive front electrode is also known as the top electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below, that is capable of achieving at least eight independent colors (white, red, green, blue, cyan, yellow, magenta, and black). As has been described previously, the gamut (color space) that results from electrophoretic display systems, such as Advanced Color electronic Paper can be variable depending upon environmental conditions and the chosen driving waveforms. See for example, U.S. Pat. No. 10,467,984, which is incorporated by reference in its entirety.

The bulk of electronic color images in the world are formatted in an RGB color space, corresponding to the red, green, and blue subpixels that are commonly used in liquid crystal displays (LCD), light emitting diode (LED) displays, or cathode ray tube (CRT) displays. A common format is an 8-bit RGB that assigns red, green, and blue subpixel values to each pixel in the image as a set of three numbers, each number spanning from 0-255. Accordingly, a standard RGB image file consists of a set of numbers corresponding to pixel in the image. When those color levels are provided to the assigned pixels, the image appears on the display. The next image file, corresponding to a new photograph or a next frame of a video, has a new set of numbers at each pixel.

Unfortunately, the RGB numbers do not map directly into the color space used with electrophoretic displays, thus it is necessary to transform the RGB image files to a new format. Additionally, because the shape of the RGB gamut is quite different from the shape of, for example an ACeP gamut, there is no simple transform that will convert an RGB file to an ACeP file.

SUMMARY

Disclosed herein are systems for transforming RGB image data to image data for Advanced Color electronic Paper. In the first stage the RGB source space is mapped into the ACeP device space using a tetrahedral decomposition of the RGB source space. The source tetrahedrons are then associated with a tetrahedral decomposition of the device colors space using the same set of vertices with the associated color names. For example if one tetrahedron is R, Y, W, K in the source space, then the associate palette colors in the device space R, Y,W, K define a tetrahedron in the device space, which may be a distorted in shape when compared to the source space tetrahedron. However, it is possible to define a smooth mapping between them using the method of Barycentric coordinates. Using this method each color point in any source space tetrahedron can be mapped to a device space tetrahedron. In particular, Barycentric quantization methods are employed to produce the tetrahedral decompositions. By mapping the source RGB color corners to the associated device palette colors it is possible to maintain the neutrality of the neutral axis (i.e., the black-white axis). This is done by using the Kuhn decomposition into six tetrahedra. In this decomposition the black-white (K-W) edge is a member of every tetrahedron. This means that any gray source color will be mapped to the segment connecting the device black and white. The Kuhn decomposition thus does not map colors that are between two adjacent hues outside of that hue range. The system can be implemented in real time using look up tables and on-device processing or the processing can be done remotely, i.e., via cloud computing, which will enable the use of a more refined color map.

In a second step, the system dithers the image set in the device color space in order to produce a greater number of perceived colors using a limited set of color primaries (typically red, green, blue, cyan, yellow, magenta, white, and black). The system includes a quantizer that implements the dithering step to produce a decomposition that cuts across the neutral axis. The resulting dithering patterns consist of palette colors of similar lightness to the RGB space with reduced graininess.

In one aspect, a color display comprising an electrophoretic display comprising a light-transmissive electrode, an active matrix of pixel electrodes, and an electrophoretic medium comprising four types of electrophoretic particles, the electrophoretic medium being disposed between the light-transmissive electrode and the active matrix of pixel electrodes, the electrophoretic display being capable of producing eight primary colors at each pixel electrode, non-transitory memory for storing look up tables mapping RGB (red, green, blue) colors to colors produced by the electrophoretic display, a processor coupled to the non-transitory memory, and a controller coupled to the processor, and configured to provide electrophoretic display pixel color instructions to the active matrix of pixel electrodes. The processor is configured to perform the following steps: receive RGB image data for each pixel in an image from the non-transitory memory, convert the RGB image data for each pixel in the image to electrophoretic display image data using a look up table (LUT) stored in the non-transitory memory, send the electrophoretic display image data for each pixel to the controller. In some embodiments, the look up table (LUT) incorporates a mapping between tetrahedra incorporating a black to white axis in an RGB color space and a black to white axis in an electrophoretic display color space. In some embodiments, converting the RGB image data for each pixel in the image to electrophoretic display image data further comprises assigning a color separation cumulate to the electrophoretic display image data based up a linear combination of primary colors produced by the electrophoretic display. In some embodiments, the processor is further configured to compare the color separation cumulate to a threshold array prior to sending the electrophoretic display image data to the controller. In some embodiments, the threshold array is a Blue Noise Mask (BNM). In some embodiments, the processor compares the color separation cumulate to a threshold array by using a quantizing function. In some embodiments, the electrophoretic medium is confined within a plurality of microcapsules or microcells. In some embodiments, the processor is further configured to resize the RGB image data. In some embodiments, the color display additionally comprises a temperature sensor and the look up table (LUT) is indexed to temperature. In some embodiments, the active matrix of pixel electrodes includes thin film transistors (TFTs) comprising metal oxide semiconductors.

In one aspect, a method for transforming RGB (red, green, blue) image data to electrophoretic display image data, wherein the electrophoretic display comprises four types of electrophoretic particles and the electrophoretic display is capable of producing eight primary colors at each pixel electrode of an active matrix of pixel electrodes. The method includes receiving RGB image data for each pixel in an image, converting the RGB image data for each pixel to electrophoretic display image data with a processor using a look up table (LUT) stored in non-transitory memory coupled to the processor, sending the electrophoretic display image data for each pixel in the image to a controller coupled to the processor, sending voltage instructions from the controller to the active matrix of pixel electrodes. In some embodiments, the look up table (LUT) incorporates a mapping between tetrahedra incorporating a black to white axis in an RGB color space and a black to white axis in an electrophoretic display color space. In some embodiments, converting the RGB image data for each pixel to electrophoretic display image data further comprises assigning a color separation cumulate to the electrophoretic display image data based up a linear combination of primary colors produced by the electrophoretic display. In some embodiments, the processor is further configured to compare the color separation cumulate to a threshold array prior to sending the electrophoretic display image data to the controller. In some embodiments, the threshold array is a Blue Noise Mask (BNM).

In one aspect, the system involves a color electrophoretic display including a light-transmissive electrode at a viewing surface, a backplane including an array of thin film transistors coupled to pixel electrodes, wherein each thin film transistor comprising a layer of a metal oxide semiconductor, and a color electrophoretic medium disposed between the light-transmissive electrode and the backplane. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles.

In some embodiments, a first electric field required to separate an aggregate formed by the third and the fourth types of particles is greater than a second electric field required to separate an aggregate formed from any other two types of particles. In some embodiments, at least two of the second, third and fourth particles are non-light-scattering. In some embodiments, the first particles are white and the second, third and fourth particles are non-light-scattering. In some embodiments, the first and third particles are negatively charged and the second and fourth particles are positively charged. In some embodiments, the first, second, third and fourth particles are respectively white, cyan, yellow and magenta in color, with the white and yellow particles being negatively charged and the magenta and cyan particles positively charged. In some embodiments, the yellow, magenta and cyan pigments exhibit diffuse reflectances at 650, 550 and 450 nm, respectively, measured over a black background, of less than 2.5% when the pigment is approximately isotropically distributed at 15% by volume in a layer of thickness 1 μm comprising the pigment and a liquid of refractive index less than 1.55. In some embodiments, the liquid is a non-polar liquid having a dielectric constant less than about 5. In some embodiments, the fluid has have dissolved or dispersed therein a polymer having a number average molecular weight in excess of about 20,000 and being essentially non-absorbing on the particles. In some embodiments, the metal oxide semiconductor is indium gallium zinc oxide (IGZO). The inventions above may be incorporated into an electronic book reader, portable computer, tablet computer, cellular telephone, smart card, sign, watch, shelf label or flash drive.

In another aspect, a color electrophoretic display including a controller, a light-transmissive electrode at a viewing surface, and a backplane including an array of thin film transistors coupled to pixel electrodes, each thin film transistor comprising a layer of a metal oxide semiconductor. A color electrophoretic medium is disposed between the light-transmissive electrode and the backplane, and the color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles. The controller is configured to provide a plurality of driving voltages to the pixel electrodes such that white, yellow, red, magenta, blue, cyan, green, and black can be displayed at each pixel electrode while keeping the light-transmissive electrode at a constant voltage. In some embodiments, the controller is configured to provide a voltage of greater than 25 Volts and less than −25 Volts to the pixel electrodes. In some embodiments, the controller is configured to additionally provide a voltage between 25 V and 0V and a voltage between −25V and 0V. In some embodiments, the metal oxide semiconductor is indium gallium zinc oxide (IGZO).

In another aspect, a color electrophoretic display including a controller, a light-transmissive electrode at a viewing surface, a backplane electrode, and a color electrophoretic medium disposed between the light-transmissive electrode and the backplane electrode. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles. The controller is configured to provide a first high voltage and a first low voltage to the light transmissive electrode, and a second high voltage, a zero voltage, and a second low voltage to the backplane electrode, such that the colors white, yellow, red, magenta, blue, cyan, green, and black can be displayed at the viewing surface, wherein the magnitude of at least one of the first high voltage, the first low voltage, the second high voltage, and the second low voltage are not the same. In some embodiments, the magnitude of the first high voltage and the magnitude of the second high voltage are the same. In some embodiments, the magnitude of the first low voltage and the magnitude of the second low voltage are the same, and the magnitude of the first high voltage and the magnitude of the first low voltage are not the same.

In another aspect, a color electrophoretic display including a controller; a light-transmissive electrode at a viewing surface, a backplane electrode, and a color electrophoretic medium disposed between the light-transmissive electrode and the backplane electrode. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors; and (c) a plurality of third and a plurality of fourth particles dispersed in the fluid, the third and fourth particles bearing charges of opposite polarity, the third and fourth particles each having a subtractive primary color different from each other and from the second particles. The controller is configured to cause the colors white, yellow, red, magenta, blue, cyan, green, and black color to be displayed at the viewing surface by providing one of a plurality of time dependent drive voltages to the backplane electrode while providing one of the following drive voltage to the light-transmissive electrode 1) a high voltage for time a first time, a low voltage for a second time, and a high voltage for a third time, or 2) a low voltage for time a first time, a high voltage for a second time, and a low voltage for a third time.

In another aspect, a system for driving an electrophoretic medium, comprising an electrophoretic display, a power source capable of providing a positive voltage and a negative voltage, where the magnitude of the positive voltage and the negative voltage are different, and a controller coupled to the top electrode driver, the first drive electrode driver, and the second drive electrode driver. The electrophoretic medium includes a light-transmissive top electrode at a viewing surface, a first drive electrode, a second drive electrode, and an electrophoretic medium disposed between the top electrode and the first and second drive electrodes. The controller is configured to provide A) in a first frame, the positive voltage to the top electrode, the negative voltage to the first drive electrode, and the positive voltage to the second drive electrode, B) in a second frame, the negative voltage to the top electrode, the negative voltage to the first drive electrode, and the negative voltage to the second drive electrode, C) in a third frame, the ground voltage to the top electrode, the ground voltage to the first drive electrode, and the positive voltage to the second drive electrode, and D) in a fourth frame, the positive voltage to the top electrode, the positive voltage to the first drive electrode, and the positive voltage to the second drive electrode. In one embodiment, the controller is configured to further provide E) in a fifth frame, the negative voltage to the top electrode, the ground voltage to the first drive electrode, and the negative voltage to the second drive electrode, and F) in a sixth frame, the ground voltage to the top electrode, the ground voltage to the first drive electrode, and the ground voltage to the second drive electrode. In one embodiment, the electrophoretic medium is encapsulated in a plurality of microcapsules and the microcapsules are dispersed in a polymer binder between the top electrode and the first and second drive electrodes. In one embodiment, the electrophoretic medium is encapsulated in an array of microcells having openings wherein the opening are sealed with a polymer binder, and the array of microcells is disposed between the top electrode and the first and second drive electrodes. In one embodiment, the electrophoretic medium comprises a non-polar fluid and four sets of particles having different optical properties. In one embodiment, the first and second sets of particles bear charges of opposite polarity, the third and fourth sets of particles bear charges of opposite polarity, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the first and second sets of particles bear charges of opposite polarity, the third and fourth sets of particles bear the same charge as the second particle, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the positive voltage is +15V and the negative voltage is −9V. In one embodiment, the positive voltage is +9V and the negative voltage is −15V.

In another aspect, a system for driving an electrophoretic medium, comprising an electrophoretic display, a power source capable of providing a positive voltage and a negative voltage, where the magnitude of the positive voltage and the negative voltage are different, and a controller coupled to the top electrode driver, the first drive electrode driver, and the second drive electrode driver. The electrophoretic medium includes a light-transmissive top electrode at a viewing surface, a first drive electrode, a second drive electrode, and an electrophoretic medium disposed between the top electrode and the first and second drive electrodes. The controller is configured to provide A) in a first frame, the positive voltage to the top electrode, the negative voltage to the first drive electrode, and the positive voltage to the second drive electrode, B) in a second frame, the negative voltage to the top electrode, the negative voltage to the first drive electrode, and the negative voltage to the second drive electrode, C) in a third frame, the ground voltage to the top electrode, the ground voltage to the first drive electrode, and the ground voltage to the second drive electrode, and D) in a fourth frame, the positive voltage to the top electrode, the positive voltage to the first drive electrode, and the positive voltage to the second drive electrode. In one embodiment, the controller is configured to further provide E) in a fifth frame, the negative voltage to the top electrode, the ground voltage to the first drive electrode, and the negative voltage to the second drive electrode, and F) in a sixth frame, the ground voltage to the top electrode, the ground voltage to the first drive electrode, and the ground voltage to the second drive electrode. In one embodiment, the electrophoretic medium is encapsulated in a plurality of microcapsules and the microcapsules are dispersed in a polymer binder between the top electrode and the first and second drive electrodes. In one embodiment, the electrophoretic medium is encapsulated in an array of microcells having openings wherein the opening are sealed with a polymer binder, and the array of microcells is disposed between the top electrode and the first and second drive electrodes. In one embodiment, the electrophoretic medium comprises a non-polar fluid and four sets of particles having different optical properties. In one embodiment, the first and second sets of particles bear charges of opposite polarity, the third and fourth sets of particles bear charges of opposite polarity, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the first and second sets of particles bear charges of opposite polarity, the third and fourth sets of particles bear the same charge as the second particle, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the positive voltage is +15V and the negative voltage is −9V. In one embodiment, the positive voltage is +9V and the negative voltage is −15V.

DETAILED DESCRIPTION

Figure 1:
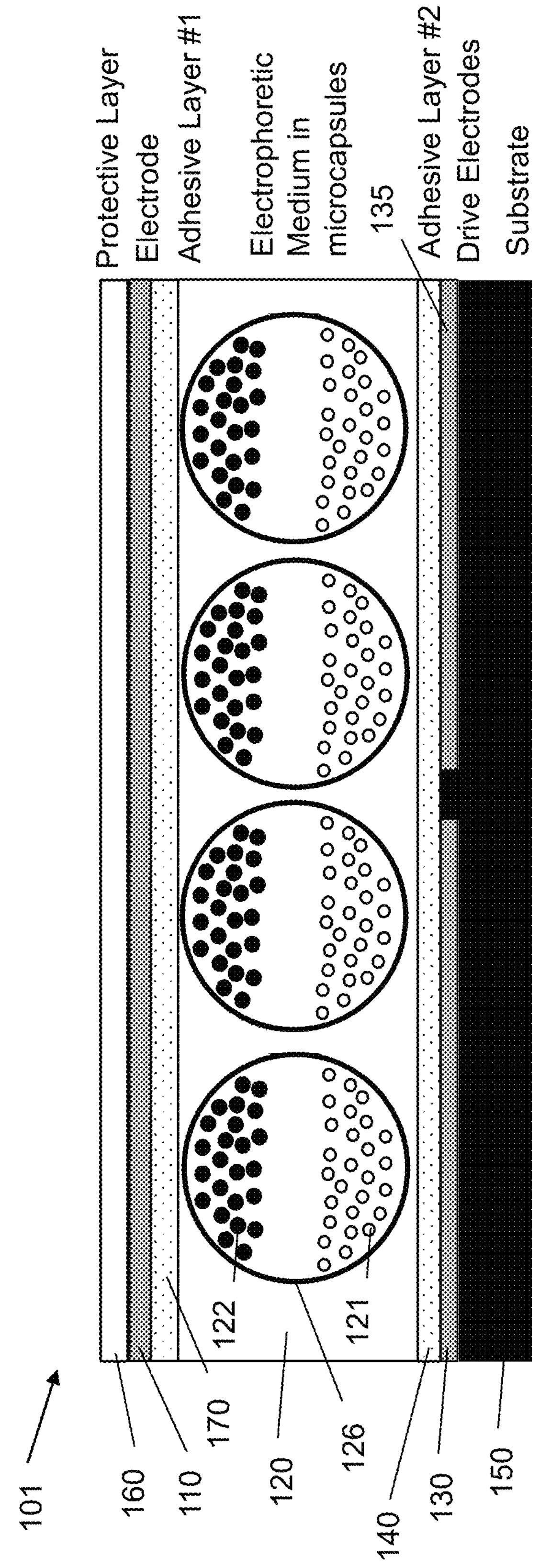
FIG. 1 is a schematic cross-section showing an embodiment of an encapsulated electrophoretic display suitable for use with the methods of the invention.

Here we are concerned with mapping source (input) colors, which are typically standard RGB values, to device colors, for example ACeP device colors, at each pixel of a color electrophoretic display. Such a display typically has a short list of possible colors that can be made, called a palette. In a typical situation among the palette colors there are typically 8 colors chosen that would have the color names black, Red, Green, Blue, Cyan, Magenta, Yellow, and White although the actual colors will not be the same as the source space colors with those names. These colors can be dithered to provide the sensation of a continuous range of tones when viewed from sufficient distance. Depending upon the number of pixels of the device and the size of the respective pixels, a sufficient distance can be a few centimeters to a few meters (or more).

In the standard situation, the eight palette colors are associated with the basic colors: K, R, G, B, C, M, Y, W that are the corners of an R,G,B cube (see FIG. 6). These colors are the most chromatic source space colors so it makes sense to map these colors to the palette colors directly. That is, if the pixel in source space is (R,G,B)=255,0,0 the that pixel should be mapped to the palette color that is associated with Red, etc. Now one way to guarantee this property is to dither the source image in the source space using only the source space colors associated with the palette. Then after the dithering, substitute the associated device color for each of the source colors at the actual pixel. This works well in some cases, but when the device colors are not well balanced, such as mapping from a cube to a distorted polygon, large color hue shifts can occur. The color hue shifts can be especially unsettling in the neutral areas. For example it might be assumed by the dithering that a neutral color can be formed by dithering equal amounts of Red, Green, and Blue, because that is possible in the source space. But if the Green color in the device space is especially weak then the target gray tones will take on a purplish hue in the new device. The unwanted color hue shifts can be minimized by using the systems and methods described herein. In some instances, the system includes electrophoretic media using a positive and a negative voltage source, where the voltage sources have different magnitudes, and a controller that cycles the top electrode between the two voltage sources and ground while coordinating driving at least two drive electrodes opposed to the top electrode. The resulting system can achieve roughly the same color states as compared to supplying each drive electrode with six independent drive levels and ground. Thus, the system simplifies the required electronics with only marginal loss in color gamut. The system is particularly useful for addressing an electrophoretic medium including four sets of different particles, e.g., wherein three of the particles are colored and subtractive and one of the particles is light-scattering.

A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 2:
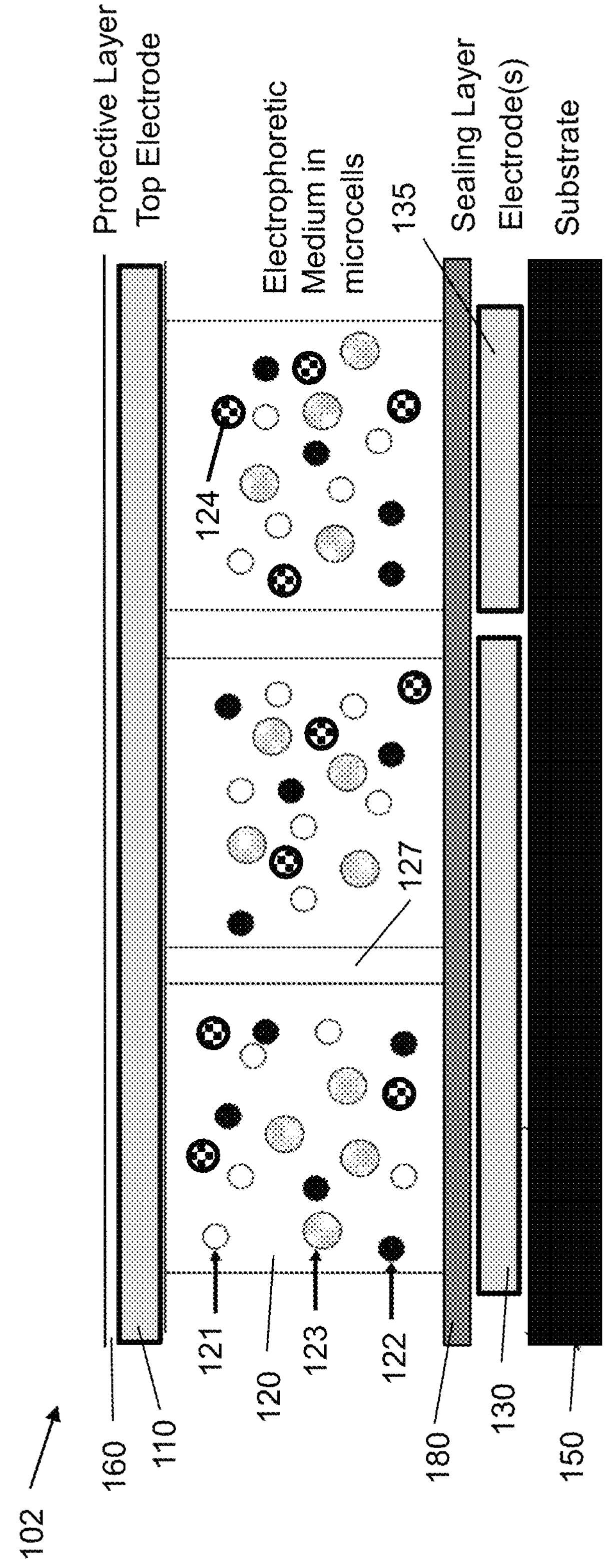
FIG. 2 is a schematic cross-section showing an embodiment of an encapsulated electrophoretic display suitable for use with the methods of the invention.

Regarding FIGS. 1 and 2, an electrophoretic display (101, 102) typically includes a top light-transmissive electrode 110, an electrophoretic medium 120, and bottom drive electrodes 130/135, which are often pixel electrodes of an active matrix of pixels controlled with thin film transistors (TFT). Alternatively, bottom drive electrodes 130/135 may be directly wired to a controller or some other switch that provides voltage to the bottom drive electrodes 130/135 to effect a change in the optical state of the electrophoretic medium 120, i.e., segmented electrodes. Importantly, it is not necessary that a junction between drive electrodes 130/135 corresponds with an intersection of microcapsules or with a wall 127 of a microcell. Because the electrophoretic medium 120 is sufficiently thin, and the capsules or microcells sufficiently wide, the pattern of the drive electrodes (square, circles, hexagons, wavy, text, or otherwise) will show when the display is viewed from the viewing surface; not the pattern of the containers. The electrophoretic medium 120 contains at least one electrophoretic particle 121, however a second electrophoretic particle 122, or a third electrophoretic particle 123, a fourth electrophoretic particle 124, or more particles is feasible. [It should be noted that third electrophoretic particles 123 and fourth electrophoretic particles 124 can be included within the microcapsules 126 of FIG. 1, but have been omitted for clarity.] The electrophoretic medium 120 typically includes a solvent, such as isoparaffins, and may also include dispersed polymers and charge control agents to facilitate state stability, e.g. bistability, i.e., the ability to maintain an electro-optic state without inputting any additional energy.

The electrophoretic medium 120 is typically compartmentalized such by a microcapsule 126 or the walls of a microcell 127. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include one or more adhesive layers 140, 170, and/or sealing layers 180 as needed. In some embodiments an adhesive layer may include a primer component to improve adhesion to the electrode layer 110, or a separate primer layer (not shown in FIG. 1 or 2) may be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

Thin-film-transistor (TFT) backplanes usually have only one transistor per pixel electrode or propulsion electrode. Conventionally, each pixel electrode has associated therewith a capacitor electrode such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 3A:
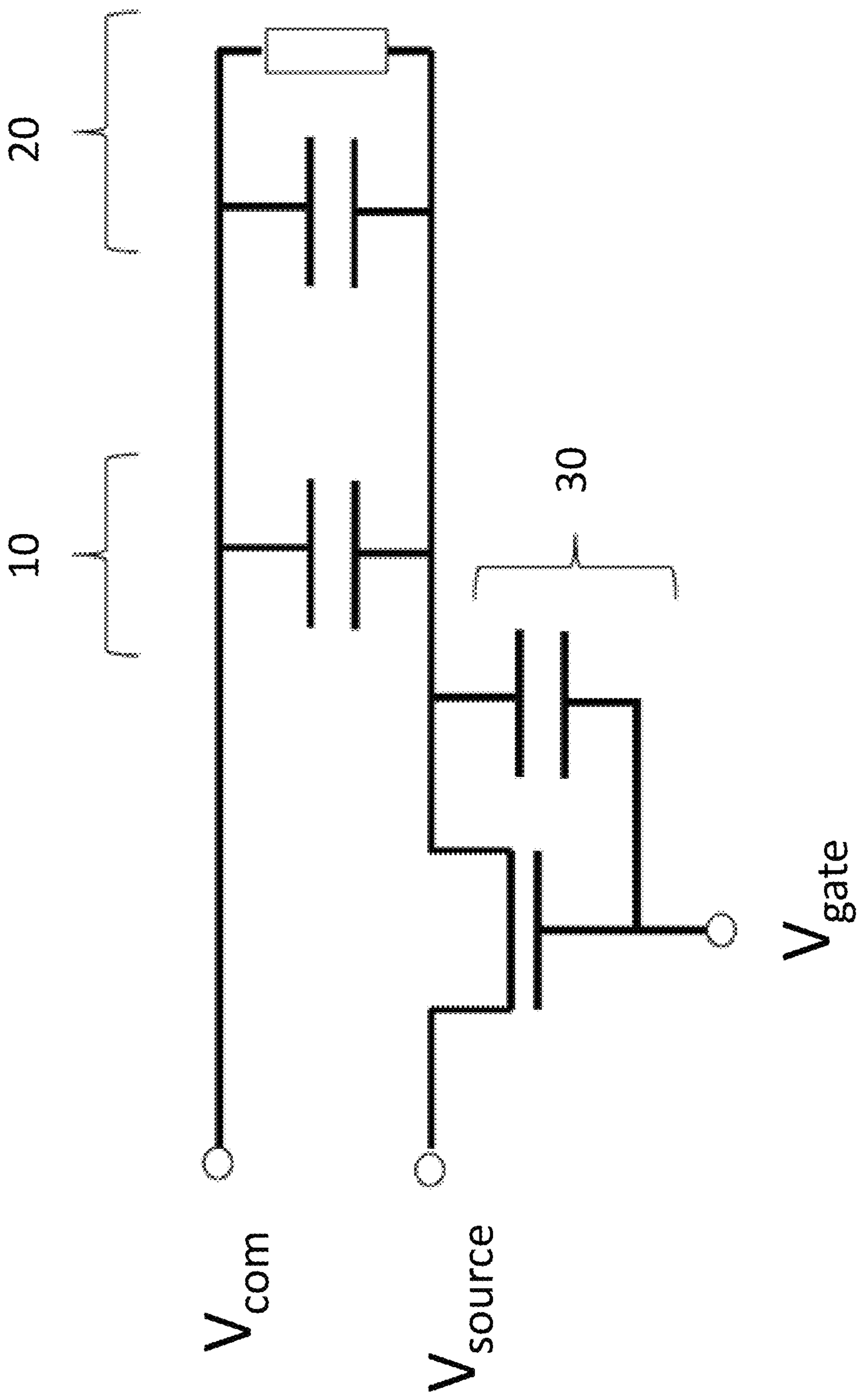
FIG. 3A illustrates an exemplary equivalent circuit of a single pixel of an electrophoretic display wherein the voltage on the single pixel is controlled with a transistor. The circuit of FIG. 3A is commonly used in active matrix backplanes.

As illustrated in in FIG. 3A, each transistor (TFT) is connected to a gate line, a data line, and a pixel electrode (propulsion electrode). When there is large enough positive voltage on the TFT gate (or negative depending upon the type of transistor) then there is low impedance between the scan line and pixel electrode coupled to the TFT drain (i.e., Vg "ON" or "OPEN" state), so the voltage on the scan line is transferred to the electrode of the pixel. When there is a negative voltage on the TFT gate, however, then there is high impedance and voltage is stored on the pixel storage capacitor and not affected by the voltage on the scan line as the other pixels are addressed (i.e., Vg "OFF" or "CLOSED"). Thus, ideally, the TFT should act as a digital switch. In practice, there is still a certain amount of resistance when the TFT is in the "ON" setting, so the pixel takes some time to charge. Additionally, voltage can leak from Vs to Vpix when the TFT is in the "OFF" setting, causing cross-talk. Increasing the capacitance of the storage capacitor $C_s$ reduces cross-talk, but at the cost of rendering the pixels harder to charge, and increasing the charge time. As shown in FIG. 3A, a separate voltage ($V_{TOP}$) is provided to the top electrode, thus establishing an electric field between the top electrode and the pixel electrode ($V_{FPL}$). Ultimately, it is the value of $V_{FPL}$ that determines the optical state of the relevant electro-optic medium. While a first side of the storage capacitor is coupled to the pixel electrode, a second side of the storage capacitor is coupled to a separate line ($V_{COM}$) that allows the charge to be removed from the pixel electrode. See, for example, U.S. Pat. No. 7,176,880, which is incorporated by reference in its entirety. [In some embodiments, N-type semiconductor (e.g., amorphous silicon) may be used to from the transistors and the "select" and "non-select" voltages applied to the gate electrodes can be positive and negative, respectively.] In some embodiments $V_{COM}$ may be grounded, however there are many different designs for draining charge from the charge capacitor, e.g., as described in U.S. Pat. No. 10,037,735, which is incorporated by reference in its entirety.

One problem with conventional amorphous silicon TFTs is that the operating voltage is limited to roughly ±15V, whereupon the transistors start to leak current and ultimately fail. While the operating range of ±15V is suitable for many two-particle electrophoretic systems, it has been found that having increased voltage ranges makes it easier to separate particles with different zeta potentials, resulting in advanced electrophoretic displays that update faster and have more reproducible colors. One solution for increasing the voltage range to a pixel electrode is to use top plane switching, i.e. whereby the voltage on the top (common) electrode is varied as a function of time. Another solution is to use advance TFT materials, such as metal oxides, to allow for higher voltage-switching, i.e., an operating range of roughly ±28V.

Figure 3B:
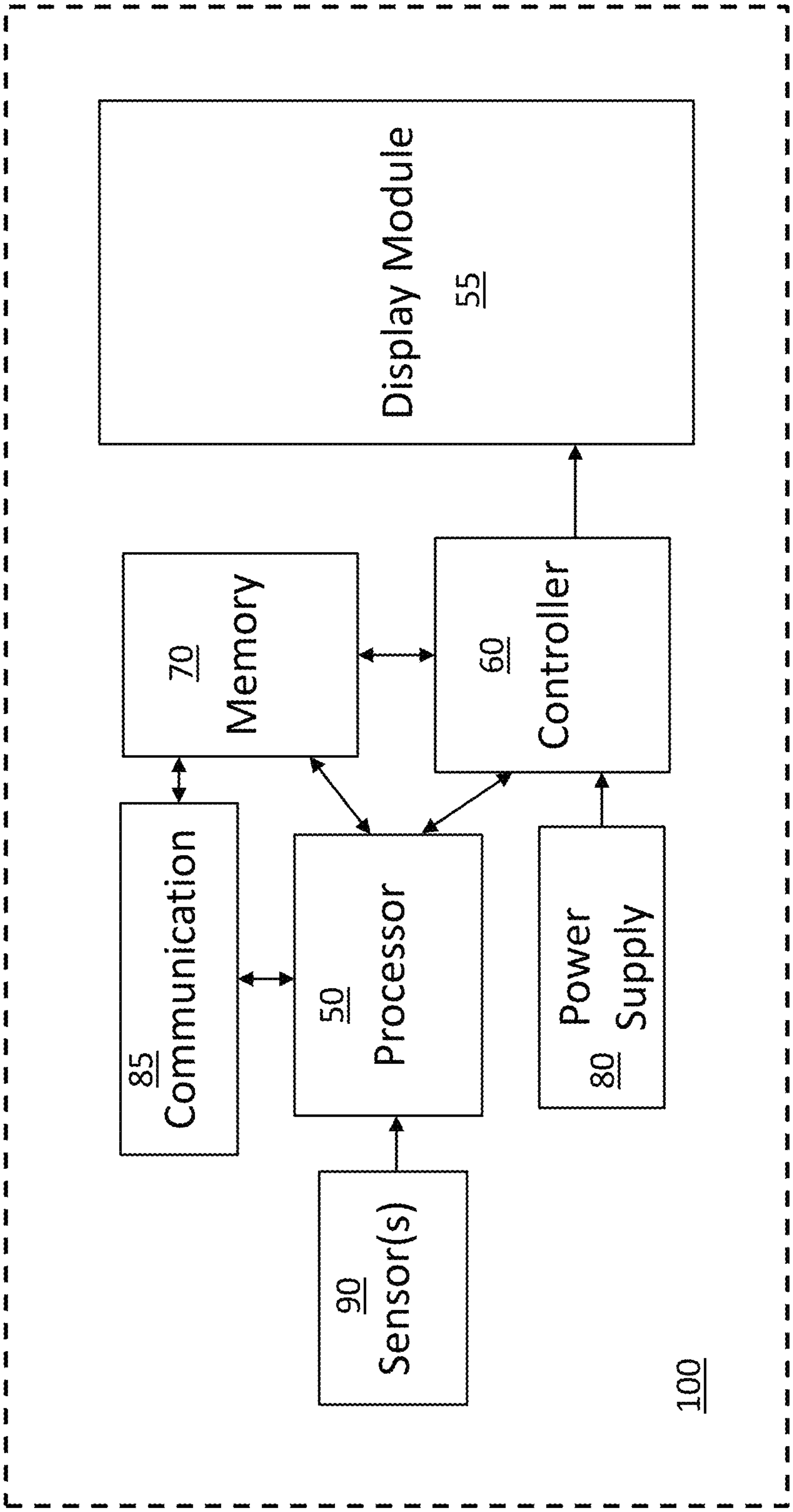
FIG. 3B illustrates an exemplary color display that includes a display module which can be any electro-optic display module, but is preferably a color electrophoretic display module. The color display also includes a processor, memory, one or more power supplies, and a controller.

Typically, the TFTs are arranged in a matrix having gate and signal lines to each TFT, as well as a drain electrode typically coupled to a pixel electrode. This active matrix backplane is coupled to an electro-optic medium, e.g., as illustrated in FIGS. 1 and 2, and typically sealed to create a display module 55, as shown in FIG. 3B. Such a display module 55 becomes the focus of a color display 100. The color display 100 will typically include a processor 50, which is configured to coordinate the many functions relating to displaying content on the display module 55, and to transform "standard" images, such as sRGB images to a color regime that best duplicates the image on the display module 55. The processor is typically a mobile processor chip, such as made by Freescale or Qualcomm, although other manufacturers are known. The processor is in frequent communication with the non-transitory memory 70, from which it pulls image files and/or look up tables to perform the color image transformations described below. The color display 100 may have more than one non-transitory memory chip. The memory 70 may be flash memory. Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The color display 100 may additionally include communication 85, which may be, for example, WIFI protocols or BLUETOOTH, and allows the color display 100 to receive images and instructions, which also may be stored in memory 70. The color display 100 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the color display 100 can be embedded in a singular integrated circuit. For example, a specialized integrated circuit may fulfill the functions of processor 50 and controller 60.

In the instance of ACePR®, each of the eight principal colors (red, green, blue, cyan magenta, yellow, black and white) corresponds to a different arrangement of the four pigments, such that the viewer only sees those colored pigments that are on the viewing side of the white pigment (i.e., the only pigment that scatters light). More specifically, when the cyan, magenta and yellow particles lie below the white particles (Situation [A] in FIG. 4), there are no particles above the white particles and the pixel simply displays a white color. When a single particle is above the white particles, the color of that single particle is displayed, yellow, magenta and cyan in Situations [B], [D] and [F] respectively in FIG. 4. When two particles lie above the white particles, the color displayed is a combination of those of these two particles; in FIG. 4, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 4), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black). It would not be easy to render the color black if more than one type of colored particle scattered light.

Figure 5:
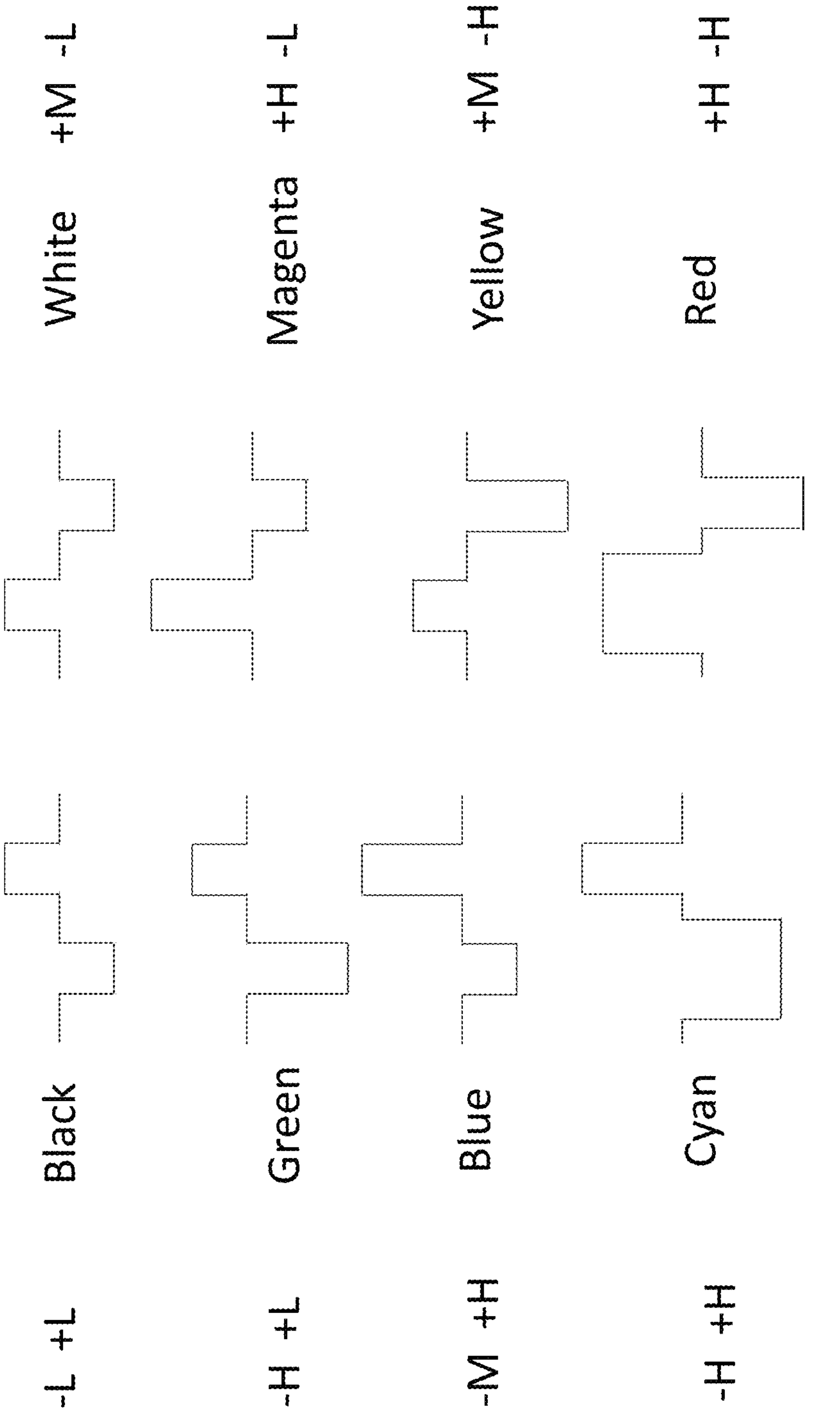
FIG. 5 shows exemplary push-pull drive schemes for addressing an electrophoretic medium including three subtractive particles and a scattering (white) particle.

It has been found that waveforms to sort the four pigments into appropriate configurations to make these colors are best achieved with at least seven voltage levels (high positive, medium positive, low positive, zero, low negative, medium negative, high negative). FIG. 5 shows typical waveforms (in simplified form) used to drive a four-particle color electrophoretic display system described above. Such waveforms have a "push-pull" structure: i.e., they consist of a dipole comprising two pulses of opposite polarity. The magnitudes and lengths of these pulses determine the color obtained. In general, the higher the magnitude of the "high" voltages, the better the color gamut achieved by the display. The "high" voltage is typically between 20V and 30V, more typically around 25V, e.g., 24V. The "medium" (M) level is typically between 10V and 20V, more typically around 15V, e.g., 15V or 12V. The "low" (L) level is typically between 3V and 10V, more typically around 7V, e.g., 9V or 5V. Of course, the values for H, M, L will depend somewhat on the composition of the particles, as well as the environment of the electrophoretic medium. In some applications, H, M, L may be set by the cost of the components for producing and controlling these voltage levels.

As shown in FIG. 5, if the top electrode is held at a constant voltage (i.e., not top plane switched), even "simple" waveforms for the ACeP® system require that the driving electronics provide seven different voltages to the data lines during the update of a selected pixel of the display (+H, +M, +L, 0, −L, −M, −H). While multi-level source drivers capable of delivering seven different voltages are available, most commercially-available source drivers for electrophoretic displays permit only three different voltages to be delivered during a single frame (typically a positive voltage, zero, and a negative voltage).

Of course, achieving the desired color with the driving pulses of FIG. 5 is contingent on the particles starting the process from a known state, which is unlikely to be the last color displayed on the pixel. Accordingly, a series of reset pulses precede the driving pulses, which increases the amount of time required to update a pixel from a first color to a second color. The reset pulses are described in greater detail in U.S. Pat. No. 10,593,272, incorporated by reference. The lengths of these pulses (refresh and address) and of any rests (i.e., periods of zero voltage between them may be chosen so that the entire waveform (i.e., the integral of voltage with respect to time over the whole waveform) is DC balanced (i.e., the integral of voltage over time is substantially zero). DC balance can be achieved by adjusting the lengths of the pulses and rests in the reset phase so that the net impulse supplied in the reset phase is equal in magnitude and opposite in sign to the net impulse supplied in the address phase, during which phase the display is switched to a particular desired color.

While modifying the rail voltages provides some flexibility in achieving differing electro-optical performance from a four-particle electrophoretic system, there are many limitations introduced by top-plane switching. For example, it is typically preferred, in order to make a white state with displays of the present invention, that the lower negative voltage $V_{M-}$ is less than half the maximum negative voltage $V_{H-}$.

An alternative solution to the complications of top-plane switching can be provided by fabricating the control transistors from less-common materials that have a higher electron mobility, thereby allowing the transistors to switch larger control voltages, for example +/−30V, directly. Newly-developed active matrix backplanes may include thin film transistors incorporating metal oxide materials, such as tungsten oxide, tin oxide, indium oxide, and zinc oxide. In these applications, a channel formation region is formed for each transistor using such metal oxide materials, allowing faster switching of higher voltages. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE.

One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver. Furthermore, a source driver capable of supplying at least five, and preferably seven levels provides a different driving paradigm for a four-particle electrophoretic display system. In an embodiment, there will be two positive voltages, two negative voltages, and zero volts. In another embodiment, there will be three positive voltages, three negative voltages, and zero volts. In an embodiment, there will be four positive voltages, four negative voltages, and zero volts. These levels may be chosen within the range of about −27V to +27V, without the limitations imposed by top plane switching as described above.

Using advanced backplanes, such as metal oxide backplanes, it is possible to directly address each pixel with a suitable push-pull waveform, i.e., as described in FIG. 5. This greatly reduces the time required to update each pixel, in some instances transforming a six-second update to less than one second. While, in some cases, it may be necessary to use reset pulses to establish a starting point for addressing, the reset can be done quicker at higher voltages. Additionally, in four-color electrophoretic displays having reduced color sets, it is possible to directly drive from a first color to a second color with a specific waveform that is only slightly longer than the push-pull waveforms shown in FIG. 5.

Figure 4:
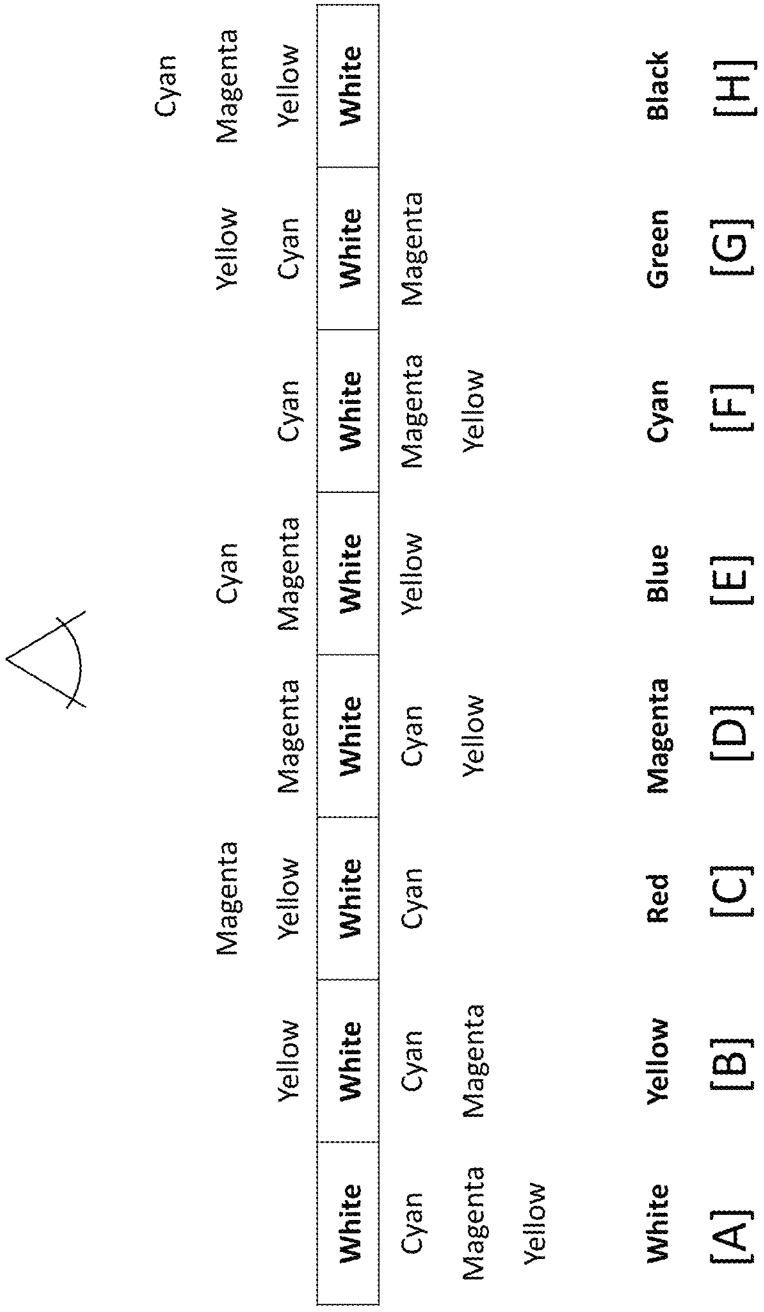
FIG. 4 is a schematic cross-section showing the positions of the various colored particles in an colored electrophoretic medium when displaying black, white, three subtractive primary colors and three additive primary colors.
Figure 6:
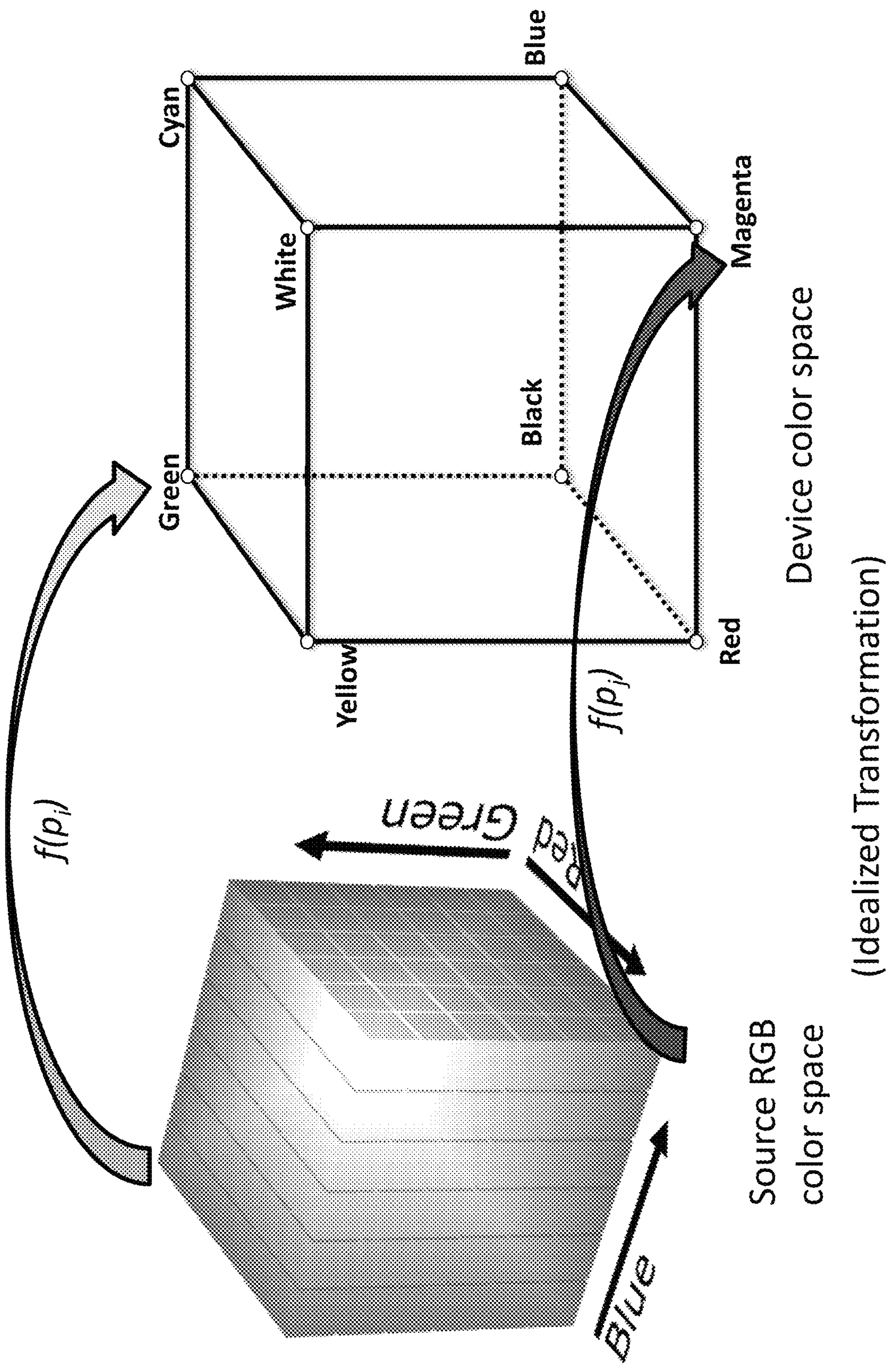
FIG. 6 depicts an idealized transformation between a standard RGB color space and an idealized device color space wherein the two color spaces are similar in shape and size. In practice the standard RGB color space and an ACeP color space are not similar in shape and size necessitating the use of tetrahedral decompositions, mapping, and reconstruction.

While it is possible to simply produce eight primary colors, as illustrated in FIGS. 4 and 5, the resulting color space is not compatible with standard RGB image data, e.g., 8-bit RGB color image data. Ideally, the extents of the eight primaries in the reflective color device would be roughly cubical as shown in FIG. 6. In such instances, a simple transformation $f(p_i)$ could be used to transform each pixel color assignment to a new pixel assignment in the new device. In this idealized example, it would be trivial to convert any of the trillions of existing RGB images into a new image suitable for use on the new device, e.g., a reflective color electrophoretic display. Unfortunately, commercially-available reflective color devices typically do not have cubical color spaces, and the size and shape of the reflective color space depends upon the illuminating light source. Furthermore, in the instance of electrophoretic displays, the color response can be depend upon other environmental factors, such as temperature, as well as device performance, such as TFT performance and frame rate.

Figure 7A:
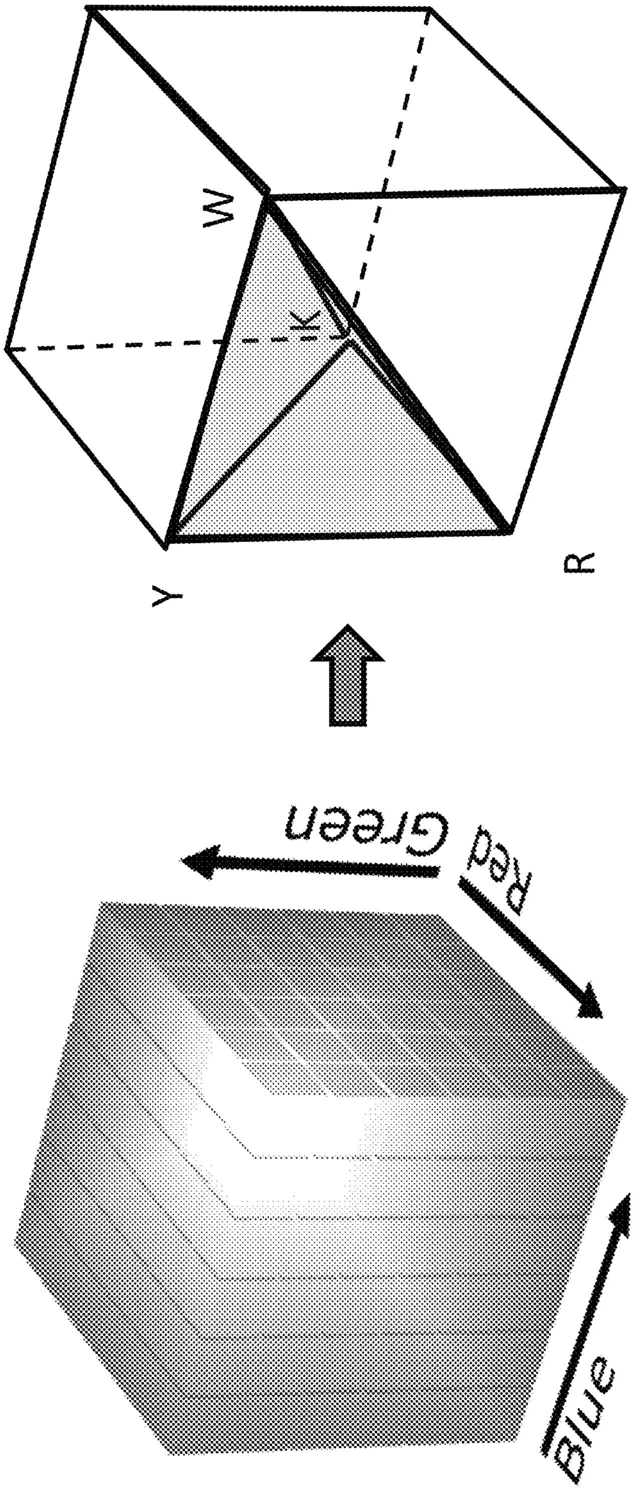
FIG. 7A shows a first step of deconstructing the RGB color space into a series of tetrahedra.
Figure 7B:
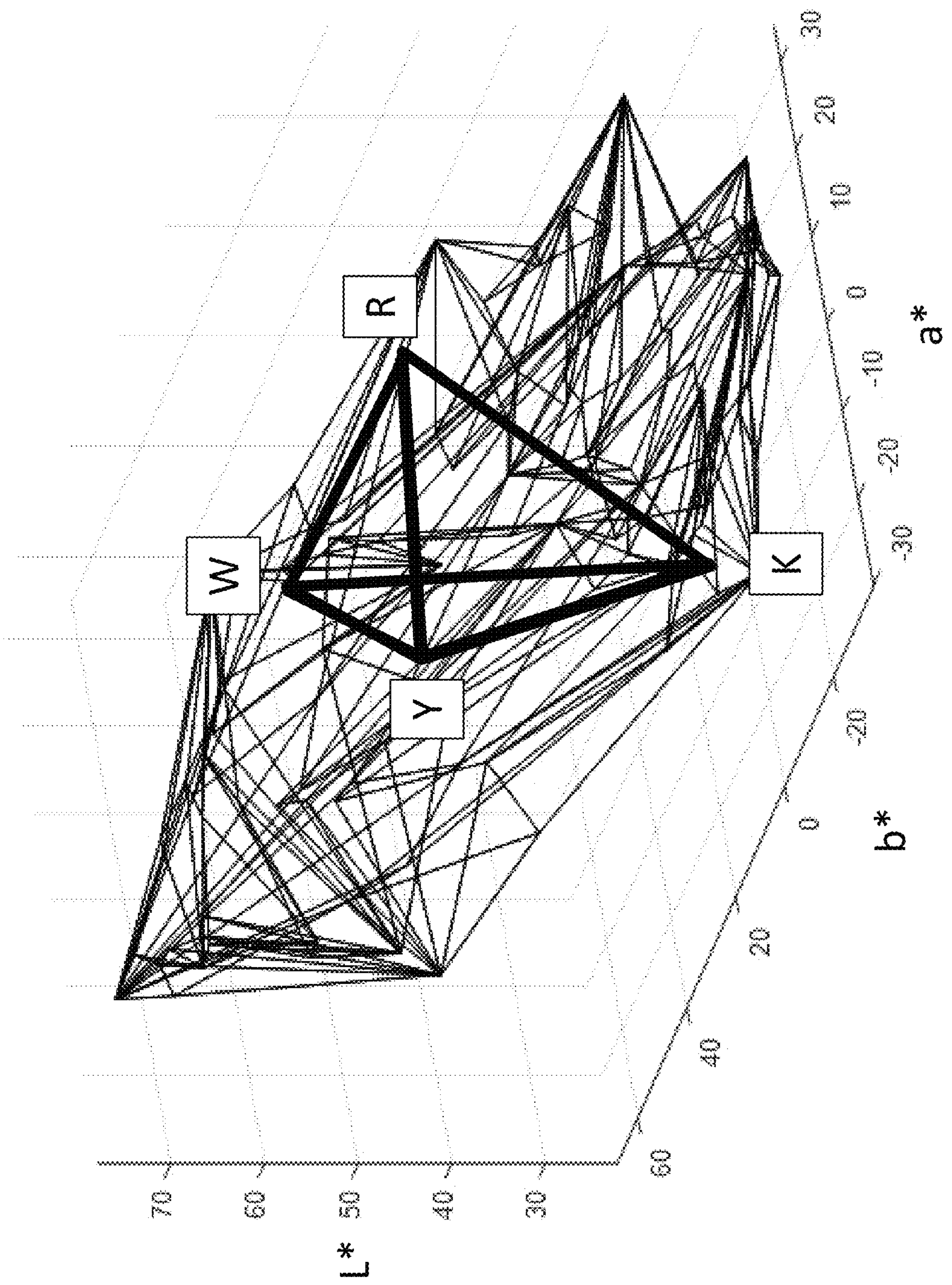
FIG. 7B shows a second set of deconstructing the device color space (ACeP color space) into a series of tetrahedra. The shape and size of the device color space is merely exemplary and may change depending upon environmental factors such as temperature of the display and the spectrum of the incident light.
Figure 7C:
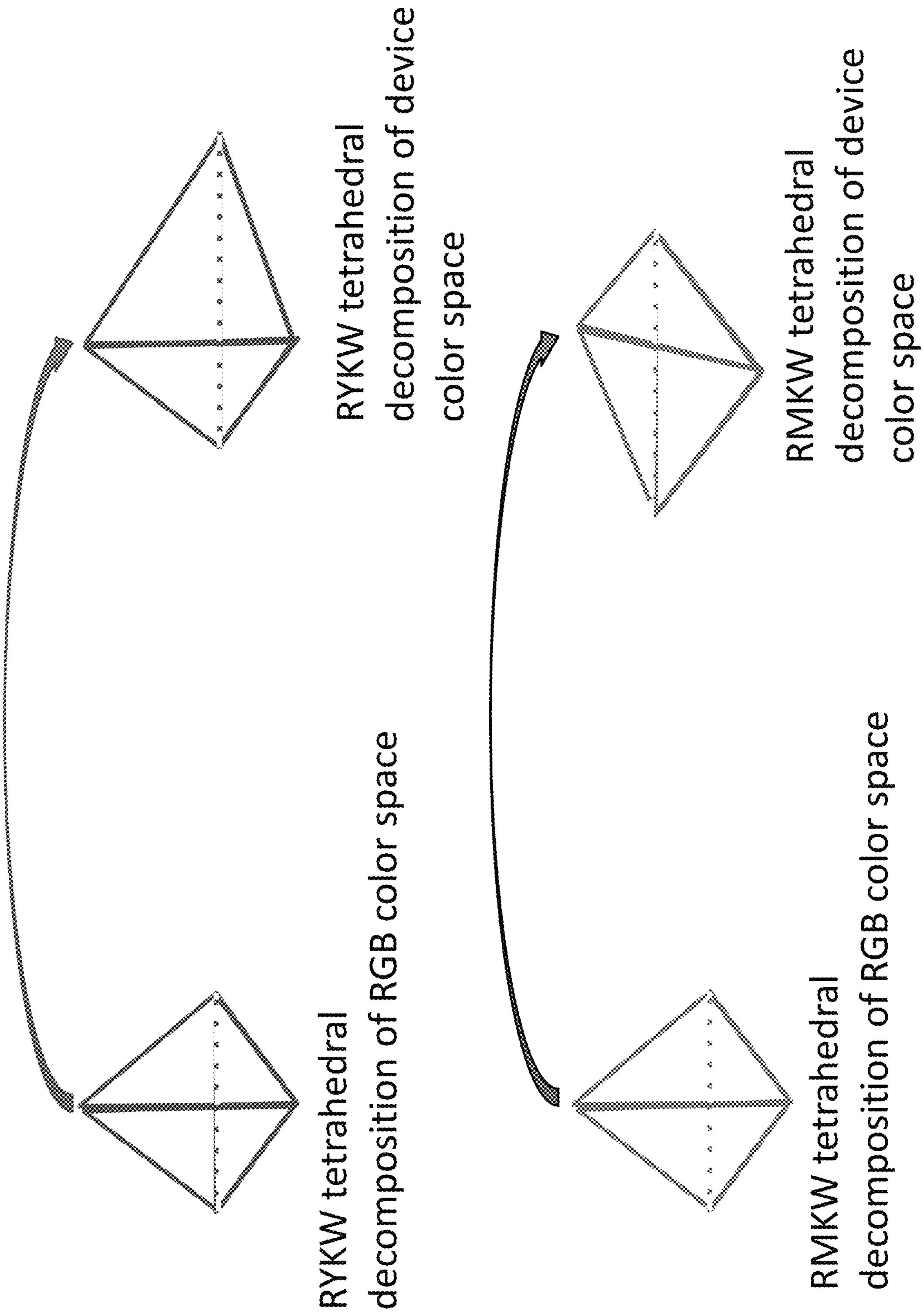
FIG. 7C shows a second step of mapping color data from a deconstructed RGB tetrahedron to a deconstructed device color space (i.e., ACeP color space) tetrahedron.

Accordingly, the invention uses a three step process to transform RGB image data into device image data. One method for transforming RGB image data into ACeP image data is illustrated in FIGS. 7A-7C. In the first step, the RGB color space and the device color space are deconvolved into a set of tetrahedra, where each tetrahedron includes the K-W axis as well as two other primary color vertices, such as RY, shown in FIGS. 7A and 7B. It is only necessary to define six tetrahedra to map the color space, however additional tetrahedra could be created. In a second step, the portion of the image color data that exists in a particular RGB tetrahedra is mapped to the image color data for the device tetrahedra, as shown in FIG. 7C. However, as illustrated in FIG. 7C, the shape of each tetrahedra need not be uniform and typically the device tetrahedra vary in shape and size whereas the RGB tetrahedra are more uniform in shape and size. In the third step, the device image data is reconstructed to produce an image file that is ultimately provided to a controller that provides instructions to the device backplane to produce the required voltages to achieve the requested colors at each pixel.

During the reconstruction of the device image data, the image data can undergo a number of additional steps to improve the perceived quality of the image when displayed on the device. For example, standard dithering algorithms such as error diffusion algorithms (in which the "error" introduced by printing one pixel in a particular color which differs from the color theoretically required at that pixel is distributed among neighboring pixels so that overall the correct color sensation is produced) can be employed with limited palette displays. See, for example, Pappas, Thrasyvoulos N. "Model-based halftoning of color images," IEEE Transactions on Image Processing 6.7 (1997): 1014-1024, which is incorporated by reference in its entirety. The reconstruction can also compensate for errors in the device, such as "blooming" wherein the electric field generated by a pixel electrode affects an area of the electro-optic medium wider than that of the pixel electrode itself so that, in effect, one pixel's optical state spreads out into parts of the areas of adjacent pixels.

In another embodiment, when implementing the color mapping, it is assumed that the input colors can be represented as a linear combination of multi-primaries. In a system described herein, this is achieved by gamut mapping the input to the device space color gamut by using a linear combination of multi-primaries (a.k.a. separation cumulate). Such a cumulate is easily dithered by establishing device primary thresholds. In alternative language, each color C in the device image can be defined as $$C = \sum_{i=1, \ldots N} \alpha_i(C)P_i$$

$$0 \le \alpha_i \le 1, \sum \alpha_i = 1$$

Where Pi is the color of a given primary i in La*b* space. The partial sums of these weights is referred to as separation cumulate $\Lambda_k$ (C), where $$\Lambda_k(C) = \sum_{i=1, \ldots k} \alpha_i(C)$$

Figure 8:
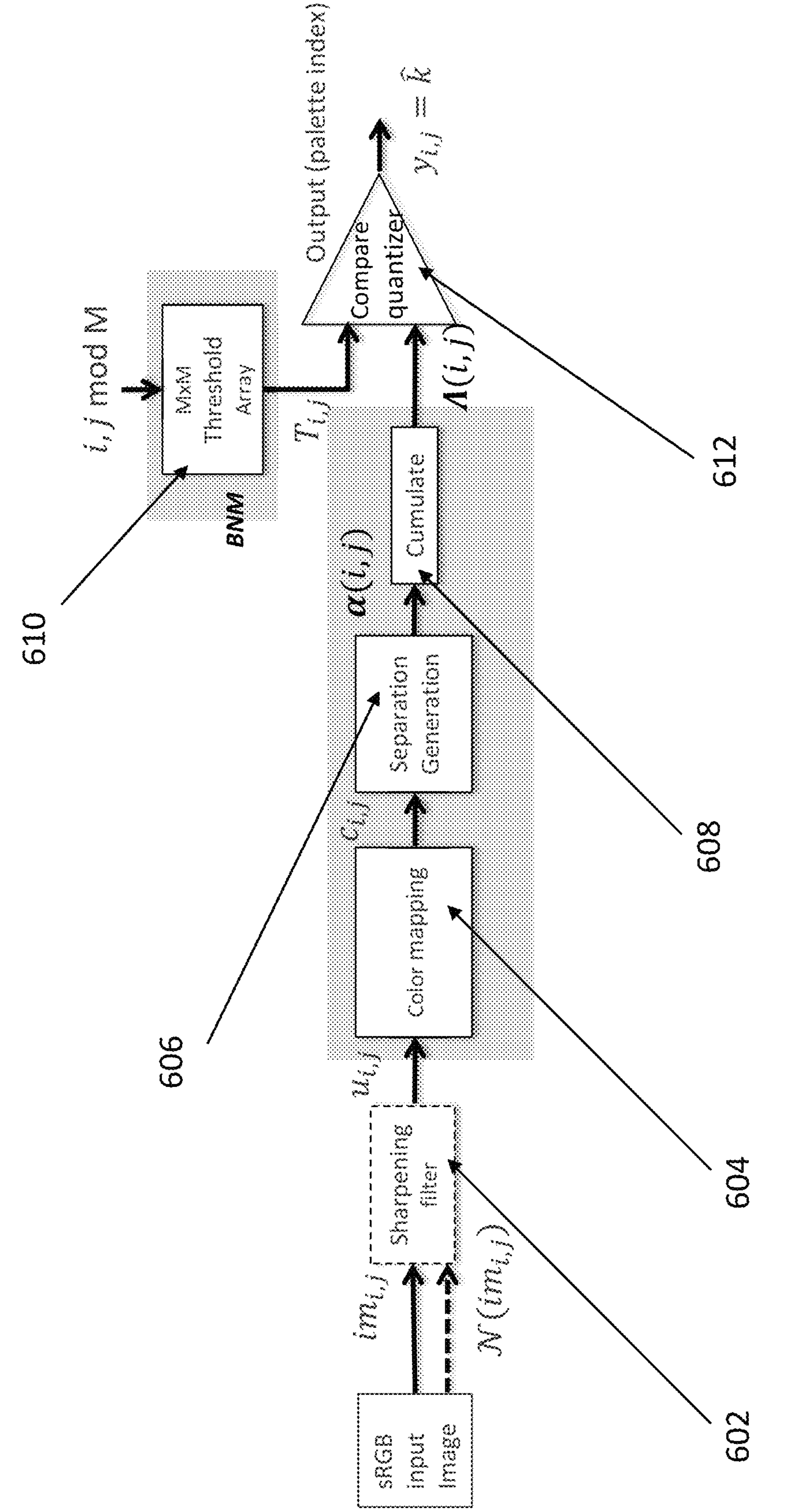
FIG. 8 illustrates that the mapped colors are then dithered to produce an ACeP image file for display on the device.

In advance embodiments, a multi-color rendering algorithm is integrated into the color mapping process as illustrated in FIG. 8, all of which steps are performed by one or more processors. Such processors are typically specially constructed for use with portable (mobile) displays, to efficiently distribute the computational steps to save energy. See, e.g., processors from Freescale or Qualcomm. As shown, standard RGB image data $im_{i,j}$ may be firstly fed through a number of clean-up steps, which may include a sharpening filter 602, which may be optional in some embodiments. This sharpening filter 602 may be useful in some cases when a threshold array T(x) or filter is less sharp than an error diffusion system. This sharpening filter 602 may be a simple finite impulse response (FIR) filter, for example 3×3, which may be easily computed. Additionally, though not shown in FIG. 8, the RGB image data can be resized, e.g., from 16-bit to 8 bit, or the actual image can be resized to accommodate for the presence of more pixels in the RGB image than are available on the target device.

Subsequently, color data may be mapped in a color mapping step 604 as discussed above with respect to FIGS. 7A-7C, and color separation may be generated in a separation generation step 606 by methods commonly available in the art, such as using the Barycentric coordinate method, and this color data may be used to index a CSC_LUT look up table, which can have N-entries per index that gives the desired separation information in the form that is directly needed by the mask based dithering step (e.g., step 612). In some embodiments, this CSC_LUT look up table may be built by combining both a desired color enhancement and/or gamut mapping, and the chosen separation algorithm, and is configured to include a mapping between the input image's color values and the color separation cumulate. In this fashion, the look up table (e.g., CSC_LUT) may be designed to provide the desired separation cumulate information quickly and in the form that is directly needed by the mask based dithering step (e.g., step 612 with the quantizer). Finally, the separation cumulate data 608 is used with a threshold array 610 to generate device image data $y_{i,j}$ using a quantizer 612 to generate multiple colors. The quantizer may be a separate integrated circuit, however this function is typically incorporated into the processor 50. In some embodiments, the color mapping 604, separation generation 606 and cumulate 608 step may be implemented as a single interpolated CSC_LUT look up table. In this configuration, the separation stage is not done by finding Barycentric coordinates in a tetrahedralization of the multi-primaries, but may be implemented by a look-up table, which allows more flexibility. In addition, output computed by the method illustrated herein is computed completely independently of the other outputs. Furthermore, the threshold array T(x) used herein may be a Blue Noise Mask (BNM).

Figure 9:
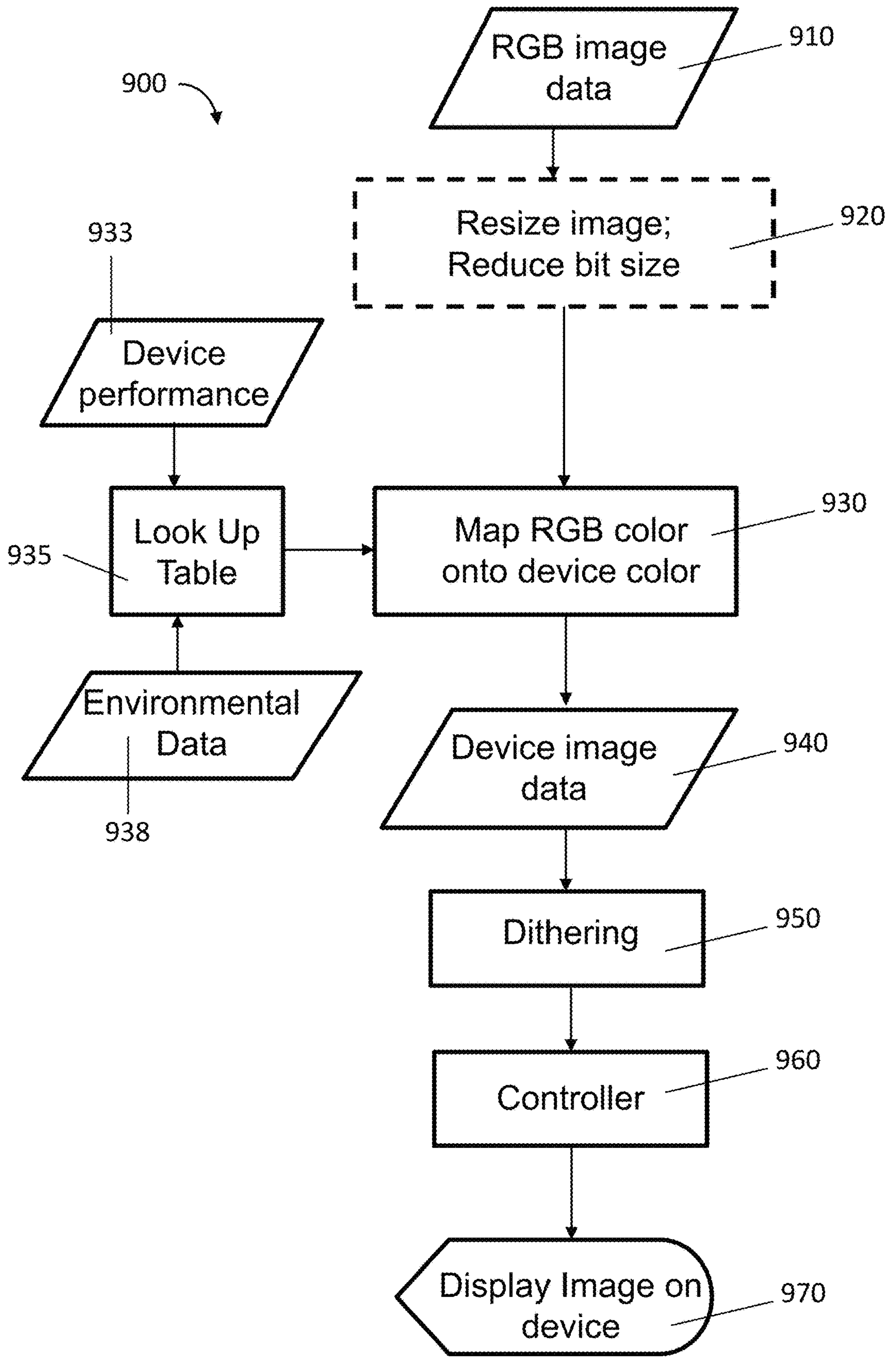
FIG. 9 is an exemplary flow chart used by a system of the invention.

A complete sequence 900 of the conversion from RGB image data, i.e., as included in a .jpeg, .png, or bitmap file, to an image on an electrophoretic color display is shown in FIG. 9. Beginning at step 910 an image file, as RGB data, is provided. The RGB data may be conditioned, resized, smoothed, sharpened, brightened, etc. in step 920. The resulting RGB data is mapped onto the device color space as discussed above with respect to FIGS. 7A-7C. In practice, the color mapping step is typically accomplished with a look up table 935, which maps the RGB data to the device data based upon pre-existing measurements of device performance, e.g., with a calibrated test pattern and a color optical bench. In many instances, the look up table will be dynamic and change depending upon measurements of device performance 933 (battery, front light, frame rate) as well as environmental data 938 such as temperature. In some embodiments, the device will have non-transitory memory for storing a plurality of look up tables 935 indexed for device performance 933 and environmental data 938.

The resulting device image data 940 may be dithered using, e.g., a Barycentric coordinate method at step 950. The device image data may also undergo error diffusion to compensate for blooming. Once the final device image data is converted, the device image data is stored in memory until it is delivered to the controller 950, which ultimately instructs the gate and source drivers to deliver suitable voltages to the front electrode and display pixels in order to display the desired image on the device 970.

Thus, the invention provides for full color electrophoretic displays that are capable of receiving standard RGB data and displaying it on a color electrophoretic display, such as an Advanced Color electronic Paper (ACeP®) device. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A color display comprising:

an electrophoretic display comprising a front light, a light-transmissive electrode, an active matrix of pixel electrodes, and an electrophoretic medium comprising four types of electrophoretic particles, the electrophoretic medium being disposed between the light-transmissive electrode and the active matrix of pixel electrodes, the electrophoretic display being capable of producing eight primary colors at each pixel electrode;

non-transitory memory for storing look up tables mapping RGB (red, green, blue) colors to colors produced by the electrophoretic display;

a processor coupled to the non-transitory memory;

a controller coupled to the processor, and configured to provide electrophoretic display pixel color instructions to the active matrix of pixel electrodes;

wherein the processor is configured to perform the following steps:

receive RGB image data for each pixel in an image from the non-transitory memory;

convert the RGB image data for each pixel in the image to electrophoretic display image data using a look up table (LUT) stored in the non-transitory memory, wherein a different LUT is used depending upon a status of the front light, wherein converting the RGB image data for each pixel in the image to electrophoretic display image data further comprises assigning a color separation cumulate to the electrophoretic display image data based upon a linear combination of primary colors produced by the electrophoretic display; and send the electrophoretic display image data for each pixel to the controller.

2. The color display of claim 1, wherein the look up table (LUT) incorporates a mapping between tetrahedra incorporating a black to white axis in an RGB color space and a black to white axis in an electrophoretic display color space.

3. The color display of claim 1, wherein the processor is further configured to compare the color separation cumulate to a threshold array prior to sending the electrophoretic display image data to the controller.

4. The color display of claim 3, wherein the threshold array is a Blue Noise Mask (BNM).

5. The color display of claim 3, wherein the processor compares the color separation cumulate to a threshold array by using a quantizing function.

6. The color display of claim 1, wherein the electrophoretic medium is confined within a plurality of microcapsules or microcells.

7. The color display of claim 1, wherein the processor is further configured to resize the RGB image data.

8. The color display of claim 1, wherein the color display additionally comprises a temperature sensor and the look up table (LUT) is indexed to temperature.

9. The color display of claim 1, wherein the active matrix of pixel electrodes includes thin film transistors (TFTs) comprising metal oxide semiconductors.

10. A method for transforming RGB (red, green, blue) image data to electrophoretic display image data, wherein an electrophoretic display comprises four types of electrophoretic particles and the electrophoretic display is capable of producing eight primary colors at each pixel electrode of an active matrix of pixel electrodes, the method comprising:

receiving a status of a front light of the electrophoretic display;

receiving RGB image data for each pixel in an image;

converting the RGB image data for each pixel to electrophoretic display image data with a processor using a look up table (LUT) stored in non-transitory memory coupled to the processor, wherein converting the RGB image data for each pixel to electrophoretic display image data further comprises assigning a color separation cumulate to the electrophoretic display image data based upon a linear combination of primary colors produced by the electrophoretic display, and wherein a different LUT is used depending upon the status of the front light;

sending the electrophoretic display image data for each pixel in the image to a controller coupled to the processor; and sending voltage instructions from the controller to the active matrix of pixel electrodes.

11. The method of claim 10, wherein the look up table (LUT) incorporates a mapping between tetrahedra incorporating a black to white axis in an RGB color space and a black to white axis in an electrophoretic display color space.

12. The method of claim 11, wherein the processor is further configured to compare the color separation cumulate to a threshold array prior to sending the electrophoretic display image data to the controller.

13. The method of claim 12, wherein the threshold array is a Blue Noise Mask (BNM).

14. The method of claim 12, wherein the processor compares the color separation cumulate to a threshold array by using a quantizing function.

15. The method of claim 10, wherein the look up table (LUT) is indexed to temperature.

* * * * *